(No Model.)

M. BRENDEL.
APPARATUS FOR CLEANING BEER FAUCETS AND PIPES.

No. 540,629. Patented June 11, 1895.

Witnesses
F. Petri-Palmedo
Emil Mueller

M. Brendel. Inventor
By his Attorney
Oscar F. Gunz

UNITED STATES PATENT OFFICE.

MICHAEL BRENDEL, OF NEW YORK, N. Y.

APPARATUS FOR CLEANING BEER FAUCETS AND PIPES.

SPECIFICATION forming part of Letters Patent No. 540,629, dated June 11, 1895.

Application filed October 17, 1894. Serial No. 526,120. (No model.)

*To all whom it may concern:*

Be it known that I, MICHAEL BRENDEL, a citizen of the United States, and a resident of the city of New York, county of New York, and State of New York, have invented a new and useful Improvement in an Apparatus for Cleaning Beer Faucets and Pipes, of which the following is a specification.

The object of my invention is to provide a new and improved apparatus for cleaning beer faucets and the pipes through which the beer is conducted to the faucets.

The invention consists in the combination with a tank divided by a partition into two compartments, of a pump on the tank a suction pipe extending from the pump into each compartment, a controlling valve in each suction pipe, an outlet neck on the pump, a hose connected with said neck and means on the free end of said hose for coupling it to a faucet.

The invention also consists in the construction and combination of parts and details, as will be fully described and set forth hereinafter and finally pointed out in the claims.

Figure 1:
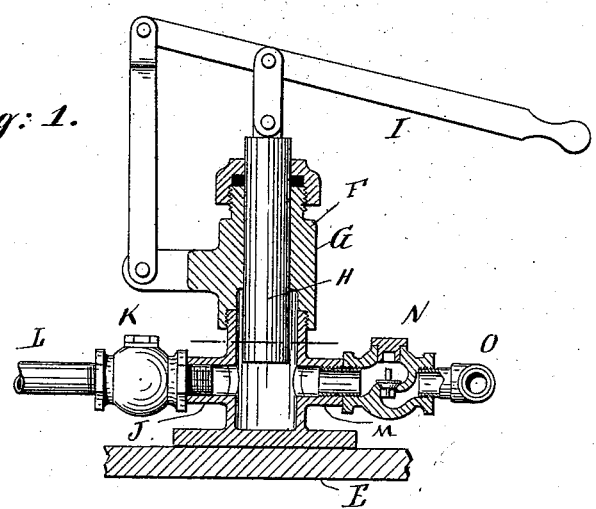
Figure 2:
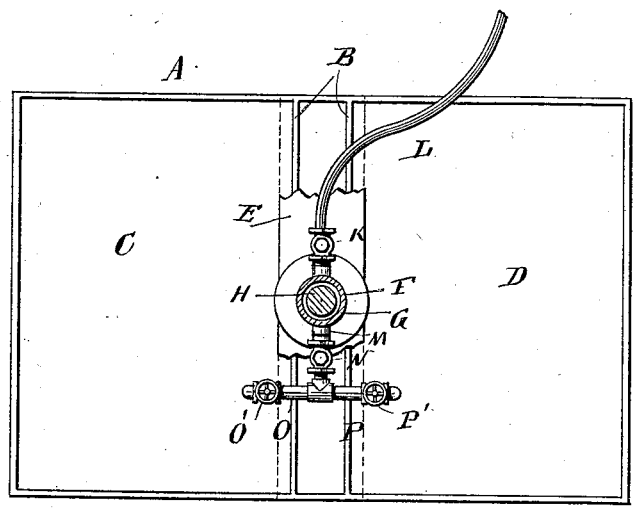
Figures 3, 4:
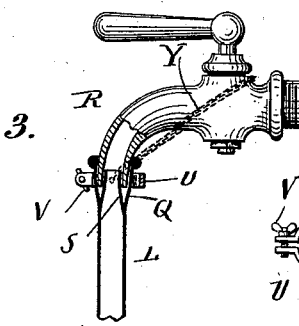

In the accompanying drawings, forming a part of this specification, and in which like letters of reference indicate like parts in all the views, Figure 1 is a vertical longitudinal sectional view of the pump. Fig. 2 is a plan view of the tank and pump, parts being shown in section. Fig. 3 is a side view of the faucet and the hose connection, parts being broken out and others shown in section. Fig. 4 is a plan view of the clamping-collar for the hose.

The tank A is divided by a double transverse partition B into two compartments C and D. On a plank E placed upon the double partition B a pump F is secured which is composed of the casing G and plunger H operated by the lever I. The outlet neck J at the bottom of the pump casing is connected with a check valve K and to the said check valve a tube or hose L is coupled. The inlet neck M of the pump is provided with the check valve N which in turn is connected with the two branch pipes O and P extending down into the two compartments C and D respectively, said pipes being provided with the cocks or gate valves O' and P' respectively. The hose L is provided at the end opposite the one connected with the check valve N, with an enlargement Q, for receiving the end of the faucet R and said enlarged part of the hose is provided with an internal neck S of rubber which can be passed into the end of the faucet. A collar T is made integral with the hose at the open end of the enlargement Q and a hinged clamp U provided with a thumb screw V for closing and tightening it, is applied on the enlargement of the hose after said enlargement has been applied on the faucet, for the purpose of holding the hose securely on the faucet.

A chain Y applied on the clamps U and passed over parts of the faucet prevents the hose from slipping off the faucet accidentally.

The partition B is made hollow so as to form an air space to prevent the cold water in one compartment cooling the hot water in the other and vice versa.

The operation is as follows:—The compartment C is filled with hot water or a hot solution of soda or any other suitable cleansing and dissolving substance and the compartment D is filled with cold water. The hose is coupled to the faucet in the manner shown and the valve P' is closed so as to cut off the compartment D and the valve O' is opened so as to connect the compartment C with the pump. When the pump is operated the hot water or hot solution from the compartment C is forced through the faucet and the beer cooling pipes or coils connected therewith and rapidly dissolves the dirt, slime, &c., that has accumulated on the walls of the same and carries said substances off. When the hot water or solution leaving the faucet or pipes connected therewith, is comparatively clear, the valve O' is closed and the valve P' is opened and cold water is now forced through the faucet and the pipes or coils connected therewith so as to thoroughly rinse them and leave them fresh, cool and clean. When all the cold water has been pumped out of the compartment D the pump is still operated so as to force air through the faucet and the pipes or coils connected therewith, for the purpose of forcing all the water out of the said pipes or cooling coils connected with the faucet. The apparatus can readily be transported and can be used successively for cleaning a number of faucets in different parts of a room or building.

Having thus described my invention, what

I claim as new, and desire to secure by Letters Patent, is—

1. The combination with a tank, of a double partition dividing it into two compartments and forming an air space between the two compartments, a pump on said tank, two suction pipes connected with said pump, one extending into each compartment, a valve in each pipe for closing it, an outlet neck on the pump, a hose connected with the outlet neck and means on the end of said hose for connecting it with a faucet, substantially as herein shown and described.

2. The combination with a tank, divided into two compartments, of a pump having a suction pipe extending into each compartment, an outlet hose connected with the pump, an internal neck on the free end of said hose, an external collar on the end of the hose, and a clamp for clamping the end of the hose on a faucet, substantially as herein shown and described.

In testimony that I claim the foregoing as my invention I have signed my name, in presence of two witnesses, this 2d day of October, 1894.

MICHAEL BRENDEL.

Witnesses:
OSCAR F. GUNZ,
D. PETRI-PALMEDO.